United States Patent [19]

Callahan et al.

[11] Patent Number: 5,256,462
[45] Date of Patent: Oct. 26, 1993

[54] WATERPROOF THERMAL RESISTANT PACKAGING WRAP

[76] Inventors: William S. Callahan, 86 S. Silver La., McKees Rocks, Pa. 15136; Karl B. Shields, 282 Alamo Dr., Pittsburgh, Pa. 15241

[21] Appl. No.: 650,855

[22] Filed: Feb. 5, 1991

[51] Int. Cl.$^5$ ............................ B32B 1/04; B32B 3/12
[52] U.S. Cl. ...................................... 428/76; 428/159; 428/166; 428/169
[58] Field of Search ............... 428/226, 233, 236, 246, 428/248, 304.4, 308.4, 47, 190, 76

[56] References Cited

U.S. PATENT DOCUMENTS 3,668,049  6/1972  Silfverlin ........................... 428/47
3,881,489  5/1975  Hartwell ............................ 428/137
4,925,512  5/1990  Briand ............................... 156/201

Primary Examiner—George F. Lesmes
Assistant Examiner—Chris Raimund
Attorney, Agent, or Firm—Dennison, Meserole, Pollack & Scheiner

[57] ABSTRACT

A waterproof, thermal resistant packaging wrap, especially for large diameter cylindrical objects, such as oils of metal. The wrap comprises a layer of woven or unwoven, hydrophobic polymeric fabric, a layer of closed- or open-cell hydrophobic polymeric foam, and an intermediate layer comprising a plurality of parallel, elongated, reinforcing members. The reinforcing members comprise an extruded thermoplastic material, wrapped in a protective sheet and calendered to a thickness of at least about 1/10 inch, and width of about 3-4 inches.

6 Claims, 2 Drawing Sheets

WATERPROOF THERMAL RESISTANT PACKAGING WRAP

BACKGROUND OF THE INVENTION

1. Field of the Invention

The invention relates to the field of packaging materials for large cylindrical objects, such as coils of aluminum and steel and spools of cable.

2. Description of Related Art

A number of problems exist in the transportation and storage of large, generally cylindrical materials such as coils of metal and spools of cable. The cylindrical units are large, typically on the order of 48 to 78 inches in diameter, and may weigh in excess of ten thousand pounds. Moreover, the units are subject to rough handling in transportation and extended periods of storage under unfavorable conditions, typically outdoors exposed to a wide temperature range and precipitation. Packaging of such units in individual wooden boxes provides a degree of protection, but is undesirable due to the addition of weight and volume to the individual units and failure to provide thermal protection against "greenhouse" condensation of moisture in contact with the packaged material.

Where spools of cable are concerned, the practice has been to nail boards called "lags" on the outside of the spool. This is a labor intensive operation which adds considerable weight to the spool and only limited protection against the elements.

It has been proposed to wrap cylindrical units with various materials as protection. For example, U.S. Pat. No. 3,660,958 proposes wrapping rolls of paper or the like with a corrugated material in order to provide basic physical protection against rough handling during transportation. While corrugated cardboard would provide a basic degree of protection, it would not be suitable for units left exposed to the elements, and in fact, U.S. Pat. No. 3,660,958 discloses rolls wrapped with corrugated cardboard only over a fraction of their length, so that a substantial portion of the length of the roll is unprotected.

It has also been proposed to wrap cylindrical materials in plastics, but the typical plastic wrap provides only a limited degree of protection against rough handling. Moreover, such plastic wraps do not provide the degree of thermal insulation necessary to avoid substantial condensation between the wrap and a coil, condensation which can cause deterioration of the wrapped material, for example, steel and aluminum coils.

An improved wrapping material for objects is disclosed in U.S. Pat. No. 3,668,049. The '049 patent is directed to a laminated packing material having two outer layers and an intermediate array of spaced, parallel, stiffening rib members secured to the outer layers. The material disclosed in the '049 patent is sold commercially by Swedeboard Inc. under the trademark LAMIFLEX and comprises a plastic or polyethylene coated outer layer with a polyethylene coated kraft paper inner skin and stiffening rib members made from wood fiber composite. This material is advantageous in that it is highly flexible in one direction, perpendicular to the stiffening rib members, but inflexible in the direction parallel to the rib members.

It has accordingly been suggested to use this packing material for wrapping large coils of metal and spools of cable. The material has proved satisfactory from the standpoint of rough handling, but the laminate deteriorates when exposed to the elements because the edges of the wood fiber ribs absorb moisture and serve as a wicking material to carry moisture throughout the entire wrapping. Also, tears in the material permit exposure of the wood fibers to moisture and the wicking effect to take place. Further, this material does not prevent condensation of moisture within the wrapping.

SUMMARY OF THE INVENTION

It is therefore an object of the invention to provide an improved material for wrapping large cylindrical objects, typically having a diameter in excess of 40 inches, in particular 40-100 inches.

It is a further object of the invention to provide an improved wrapping material which will prevent damage to such large cylindrical objects due to rough handling and provide thermal insulating properties sufficient to minimize and/or prevent greenhouse condensation and/or damage by water when exposed to the elements.

To achieve these and other objects, the present invention provides a waterproof, thermal resistant, packaging wrap comprising a first layer of a flexible, hydrophobic polymeric fabric material and a second layer of a flexible, hydrophobic, cellular polymeric sheet. Intermediate the first and second layers are a plurality of parallel stiffening ribs, spaced by no more than ¼ inch, and preferably directly abutting. The ribs themselves are formed from a non-hygroscopic polymeric material formed by extrusion of a heat softened thermoplastic material into rod form, followed by wrapping with a protective sheet and calendering the rod and sheet to the appropriate shape, generally at least 1/16 inch thick and about 3-4 inches in width.

The stiffening ribs of the invention are formed according to U.S. Pat. No. 4,925,512, which is incorporated herein by reference. The extruded polymer material used according to the '512 patent can be either a new thermoplastic material or scrap, and can include fillers in an amount of up to 40% by weight of the thermoplastic. A waste mixture of polyethylene and paper fiber is a typical raw material, although other thermoplastics and mixtures are equally suitable. The protective wrap for the material can be a polymer or can itself be a kraft paper which becomes impregnated with the polymer during the wrapping and calendaring process to the extent that it does not absorb substantial amounts of water.

The arrangement of the stiffening ribs between the first and second layers is similar to that discussed in U.S. Pat. No. 3,668,049, incorporated herein by reference.

For the wrapping of large size cylinders, particularly 48 to 78 inches in diameter, (151-245 inches circumference) it is preferred to use parallel ribs approximately 2-5 inches, and preferably 3 to 4 inches in width. The preferred ratio of cylinder circumference to rib width is therefore approximately 20 to 82.

The lamination of first and second sheets and stiffening ribs can be held together by a hot melt adhesive such as ethylene vinyl acetate, but is preferably held together by a conventional nonaqueous-based pressure sensitive adhesive. The use of a pressure sensitive adhesive with the sheets of the invention results in a product which can re-adhere if bent past the point at which the laminations will separate. Therefore, the use of the pressure sensitive adhesive results in a self-repairing property for the materials of the invention.

The first layer of polymeric fabric according to the invention is preferably a spun bonded polypropylene such as TYPAR° which can for instance be in the range of 10-20 mils, and typically about 13 mils thick. Other woven and non-woven fabrics can be used providing they do not absorb water and therefore can serve as a moisture barrier. This fabric layer is preferably printable.

The second layer of the invention can be a closed cell or open-cell foam material such as polyethylene, polypropylene or polyurethane. Closed-cell is preferred. These materials will typically be between 1/16 and ¼, preferably 1/16 to 1/8 of an inch in thickness and have a density in the range of 1-2.5 lbs./ft$^3$, preferably about 1.2-1.5 lbs/ft$^3$. The foam material does cushion the wrapped object, but more importantly serves to insulate the wrapped object from external temperature changes, and therefore prevents greenhouse condensation as the object is moved from a warm and humid environment to a cooler dryer environment. The thermal conductivity of the foam is generally about 0.20-0.40 Btu/ft$^2$/Hr/°F./in.

The stiffening ribs are typically between ⅛ and ¼ inch in thickness. The use of materials of lesser thickness, 1/10-⅛ web, is advantageous if one desires to provide a flexibility of the wrapping material in the direction transverse to the ribs. If one desires to provide an absolutely rigid material in that direction, a thickness closer to ¼ inch is necessary. It is preferred that the ribs of the invention edge abut each other directly in the longitudinal direction, in order to further prevent infiltration of moisture. If necessary to provide additional flexibility, however, there can be as much as ¼ inch space between the parallel stiffening ribs.

DESCRIPTION OF THE PREFERRED EMBODIMENTS

Figure 1:
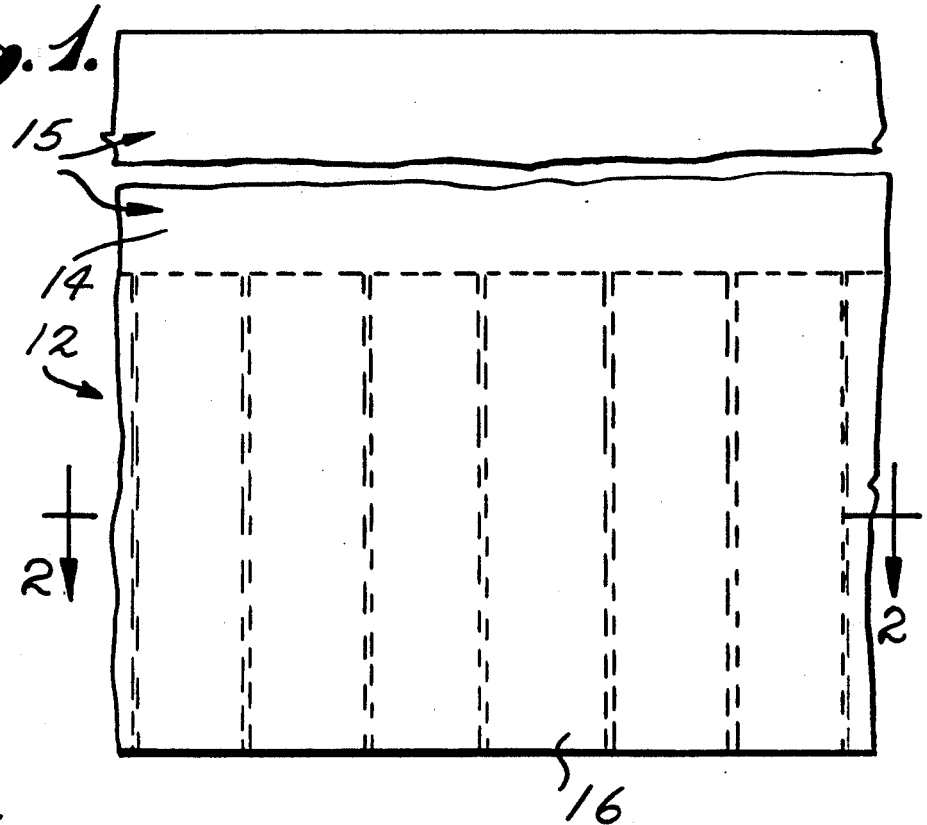
FIG. 1 is a plan view of a first wrapping material according to the invention.
Figure 2:
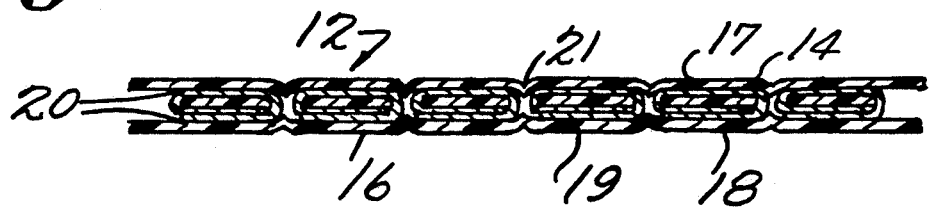
FIG. 2 is a cross-sectional view along line 2—2 of the first wrapping material of the invention.

As shown in FIGS. 1 and 2, an end portion of the material of the invention 12 includes a top sheet of spun bonded polypropylene 14 and a plurality of parallel stiffening ribs 16 comprising extruded thermoplastic material 17 wrapped in kraft paper 18 and calendered to a thickness of about 1/6 inch and width of about 3 inches. The bottom of this material is laminated to a 1/16 inch layer of closed cell polypropylene foam 19, with the laminations held together by layers of a pressure sensitive adhesive 20. The parallel stiffening ribs are separated by approximately ⅛ inch, with the first and second layers of material showing puckers 21 between the ribs. A longitudinal end portion 15 is provided without ribs, with fabric 14 laminated to foam layer 19.

Figure 3:
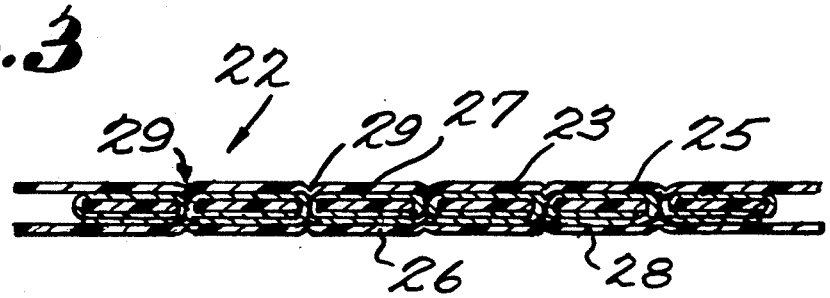
FIG. 3 is cross-sectional view of a second wrapping material according to the invention.

FIG. 3 shows in cross-section a similar wrapping material 22 formed of a first layer 23 of a woven polypropylene, pressure sensitive adhesive 24, and a second layer 28 of open-cell polyurethane foam. Stiffening ribs 25 with thermoplastic 26 and kraft paper 27, are closely abutted, but the top and bottom layers of material nevertheless show puckers 29 between the ribs.

Figure 4:
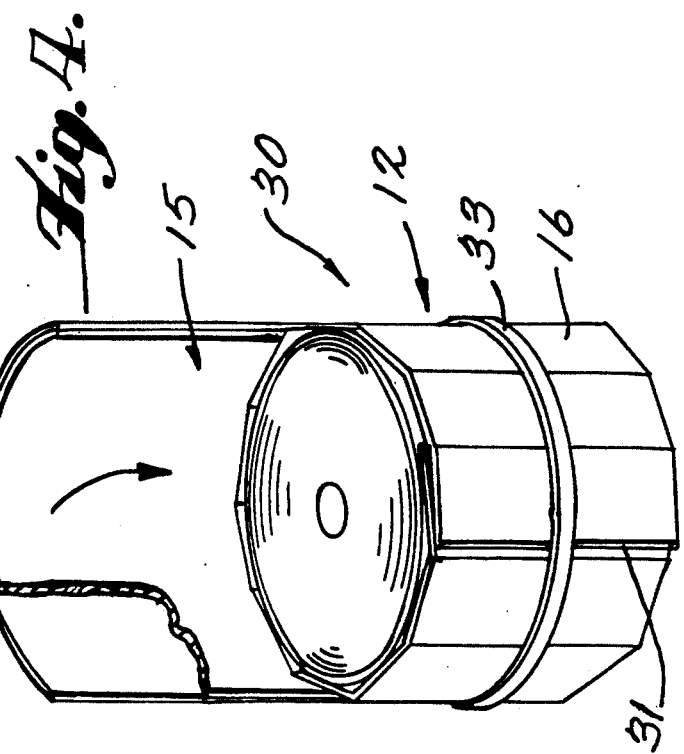
FIG. 4 is a side view of a coil of metal wrapped with a material as shown in FIG. 1.

In FIG. 4, a coil 30 of aluminum 48 inches in diameter has been wrapped with the material shown in FIG. 1. The longitudinal end portion of this material 15 has no stiffening ribs between the first and second layers, and can be used for protection of the top of the coil since the coils are normally shipped and stored with their axes vertical. A similar ribless portion may be provided at the other longitudinal end of the wrap.

One lateral end portion 31 of the wrap can be wrapped over the other lateral end portion and the wrap secured with a band 33. Because the stiffening ribs are non-wicking, it is not necessary to seal either the longitudinal or lateral end portions of the wrap to protect against moisture wicking or infiltration.

Figure 5:
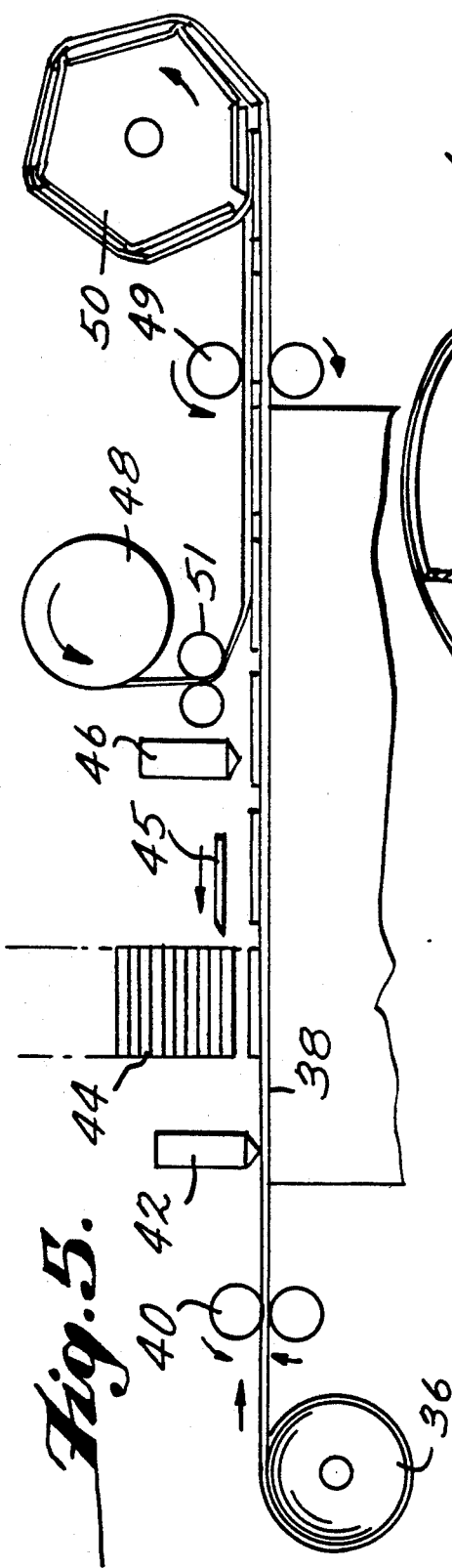
FIG. 5 is a schematic diagram of a process and apparatus for preparing the wrapping material of the invention.
Figure 3A:
FIG. 3a is an enlarged view of a portion of the wrapping material of FIG. 3.

FIG. 5 shows schematically the process by which a wrap material is produced. A roll 36 of spun bonded polypropylene is unwound and passes between tensioning rollers 40 which place a constant tension on the material undergoing the process. A series of nozzles 42 distributes a pressure sensitive adhesive evenly over the width of the fabric 38, and the adhesive coated fabric is passed beneath a dispensing station 44 for the ribs. In dispensing station 44, a stack of ribs is located above the traveling web 38, and a dispensing means 45 drops parallel ribs onto the web with a predetermined spacing therebetween. The web and ribs are then passed beneath another adhesive dispensing station 46 which covers the ribs with adhesive. A foam roll 48 is then unwound onto the adhesive covered ribs and the laminated material passes between rollers 49 which compress the laminate and again place a constant tension on the laminated material which passes to a take-up roll 50.

The foam roll 48 is placed under tension by bars 51 as it is unrolled for lamination. This is a significant aspect of the invention, as the foam layer must be under tension in the laminate. When the laminate is used to wrap a product, the fabric layer forms the outside and is placed under greater tension as the laminate is wound around an object. This action also places the inner foam layer under a degree of compression. Placing the foam layer under an initial tension prevents delamination of the wrap.

EXAMPLES

Comparative testing was performed to determine the insulative value of wraps according to the invention. Three groups of six aluminum coils of dimensions 56" diameter and 48" height, weighing about 13,500 lbs each, were tested.

Test group A coils were wrapped in "domestic" packaging, 5.75 mil polyethylene film.

Test group B coils were wrapped in "domestic" packaging and had an outer wrap comprising 1/16" closed-cell, polyethylene foam, 0.16"×3" extruded thermoplastic wrapped in kraft paper, and 13 mil spun bonded polypropylene, with the ribs substantially abutted.

Test C coils were wrapped in "domestic" packaging and had an outer wrap as in that of group B, but with ⅛" closed-cell, polyethylene foam instead of 1/16".

All coils were put through three temperature/humidity cycles over a 21 day period to simulate climate changes experienced in normal shipments. In one cycle, the coils are placed in a freezer at 5° F. for five days, then transferred to a warehouse and allowed to equilibrate at room temperature for 2 days. Temperature recording devices were placed inside the coils and between the coils and the outer wrap, and temperature measurements made when the coils are removed from the freezer, when the coils are transferred to the warehouse, and at defined periods thereafter.

Results for the tests are set forth in the Table below.

TABLE

| Test Group | Cycle | Warehouse Conditions | CT | PT | CT₀ | PT₀ | M.V. | CT₂ | PT₂ | M.V. | CT₆ | PT₆ | M.V. | CT₁₀ | PT₁₀ | M.V. |
|---|---|---|---|---|---|---|---|---|---|---|---|---|---|---|---|---|
| A | 1 | 83° F. 72% RH | 5° | 5° | 5° | 6° | Frozen | 7° | 22° | 3.127 | 10° | 31° | 8.327 | 18° | 42° | 14.004 |
|   | 2 | 72° F. 89% RH | 6° | 6° | 6° | 7° | Frozen | 8° | 19° | 3.981 | 12° | 34° | 9.571 | 19° | 41° | 16.156 |
|   | 3 | 64° F. 68% RH | 6° | 6° | 6° | 6° | Frozen | 8° | 15° | 2.741 | 9° | 29° | 8.021 | 17° | 39° | 12.941 |
| B | 1 | 83° F. 72% RH | 5° | 6° | 5° | 6° | Frozen | 6° | 25° | 1.311 | 9° | 20° | 4.211 | 17° | 29° | 6.157 |
|   | 2 | 71° F. 89% RH | 6° | 6° | 6° | 6° | Frozen | 7° | 22° | 1.417 | 10° | 22° | 4.395 | 18° | 31° | 6.394 |
|   | 3 | 64° F. 68% RH | 5° | 6° | 5° | 6° | Frozen | 6° | 21° | 1.011 | 9° | 19° | 4.011 | 16° | 27° | 5.971 |
| C | 1 | 83° F. 72% RH | 6° | 7° | 6° | 7° | Frozen | 7° | 22° | 1.211 | 9° | 20° | 3.951 | 17° | 28° | 6.0127 |
|   | 2 | 71° F. 89% RH | 6° | 7° | 6° | 7° | Frozen | 6° | 23° | 1.011 | 9° | 21° | 3.909 | 19° | 31° | 6.101 |
|   | 3 | 64° F. 68% RH | 5° | 7° | 5° | 7° | Frozen | 6° | 20° | 1.039 | 10° | 20° | 4.012 | 17° | 26° | 6.012 |

Key to Table
All temperatures in °F. RH = Relative humidity.
All times in hours.
$CT_X$ = Coil temperature at time X.
$PT_X$ = Package temperature at time X.
Initial CT and PT are measured immediately upon removal from freezer, while $CT_0$ and $PT_0$ are measured upon transfer to warehouse.
M.V. = Moisture volume in liters, average of six coils.

The use of the wrap according to the invention substantially reduces the rate at which the coil warms up, and the rate at which moisture forms. After 10 hours, the coils wrapped according to the invention had a moisture volume less than half of that of the coils with "domestic wrap" only.

What is claimed is:

1. A waterproof, thermal resistant, packaging wrap, comprising:
   a) a first layer of a flexible, hydrophobic polymeric fabric material;
   b) a second layer of a flexible, hydrophobic, cellular polymeric sheet material, in face-to-face relationship with said first layer;
   c) a layer intermediate said first and second layers comprising a plurality of substantially non-hygroscopic, parallel, elongated reinforcing and stiffening members having adjacent edges separated from each other by no more than ¼ inch, each said member comprising a thermoplastic material extruded in rod form, wrapped in a protective sheet, and calendered to a final thickness of at least about 1/10 inch and width of about 3–4 inches; and
   d) a hot melt or non-aqueous pressure sensitive adhesive adhering together said first and intermediate and said second and intermediate layers, with said second layer under tension.

2. A wrap according to claim 1, wherein said first layer is non-woven, spun bonded polypropylene fabric.

3. A wrap according to claim 1, wherein said second layer is a closed-cell foam of polyethylene, polypropylene or polyurethane of thickness about 1/16 to ¼ inch.

4. A wrap according to claim 3, wherein said foam has a density about 1–2 lbs/ft³.

5. A wrap according to claim 1, wherein said parallel reinforcing members substantially abut each other.

6. A wrap according to claim 1, wherein said parallel reinforcing members comprise a protective sheet of kraft paper.

* * * * *